United States Patent [19]

McKenney

[11] 4,366,605
[45] Jan. 4, 1983

[54] ANTI-THEFT CABLE DEVICE FOR CAR TOP CARRIERS

[76] Inventor: John McKenney, 20 Vista del Sol, South Laguna, Calif. 92677

[21] Appl. No.: 230,668

[22] Filed: Feb. 2, 1981

[51] Int. Cl.³ .............................................. A44B 13/00
[52] U.S. Cl. ............................... 24/230.5 R; 224/273; 224/315
[58] Field of Search ............ B60R/27/00; 224/42.39, 224/42.4, 42.45 R, 42.45 A, 273, 309, 315, 321–323, 329; 70/15, 18, 258, 58; 24/68 CD, 69 CT, 115 R, 115 A, 115 H, 129 B, 265 CD; 248/208, 499, 503

[56] References Cited

U.S. PATENT DOCUMENTS

| | | | |
|---|---|---|---|
| 2,302,300 | 11/1942 | Davies | 224/42.45 R |
| 2,357,203 | 8/1944 | Jimmes | 224/329 X |
| 2,474,513 | 6/1949 | Behrens | 224/42.45 R |
| 2,626,713 | 1/1953 | Peacock | 224/42.45 A |
| 3,132,780 | 5/1964 | Binding | 224/315 |
| 3,286,892 | 11/1966 | Marshall | 224/42.45 R |
| 4,028,916 | 6/1977 | Pender | 70/15 |

FOREIGN PATENT DOCUMENTS

| | | | |
|---|---|---|---|
| 45530 | 6/1935 | France | 224/329 |
| 1218525 | 5/1960 | France | 248/208 |

*Primary Examiner*—Joseph Man-Fu Moy
*Assistant Examiner*—Gary E. Elkins
*Attorney, Agent, or Firm*—Lawrence Fleming

[57] ABSTRACT

An anti-theft tether in the form of a steel cable with a novel clip on one or both ends which fits the edge of a car door or window, and cannot be readily removed when the door or window is closed. The outer part of the tether is run through or around an object to be carried on the top of the car, such as a sailboard, a surfboard, or skis. One form of clip is made of thin, hard sheet metal, such as steel, and fits over the edge of the window glass. Another form of clip is flexible, preferably in the form of a short length of flat steel wire braid with an enlargement on one end. This is inserted between the car door and the door jamb, and the door closed and locked.

7 Claims, 8 Drawing Figures

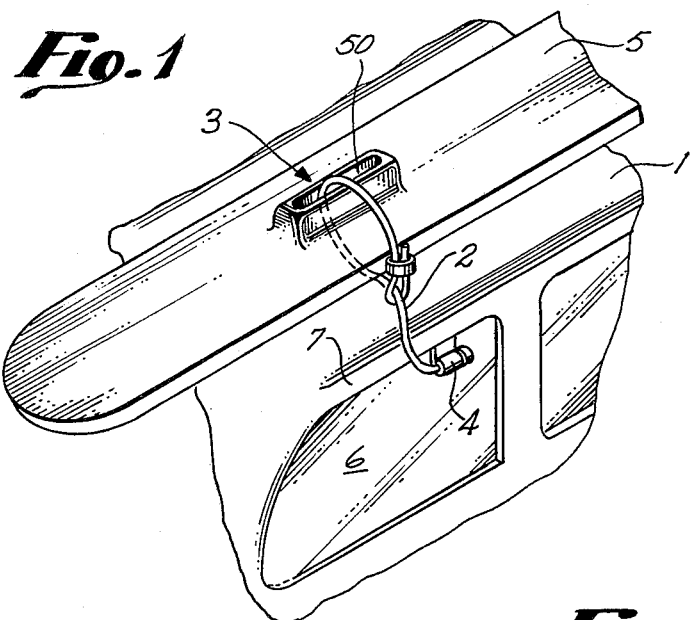
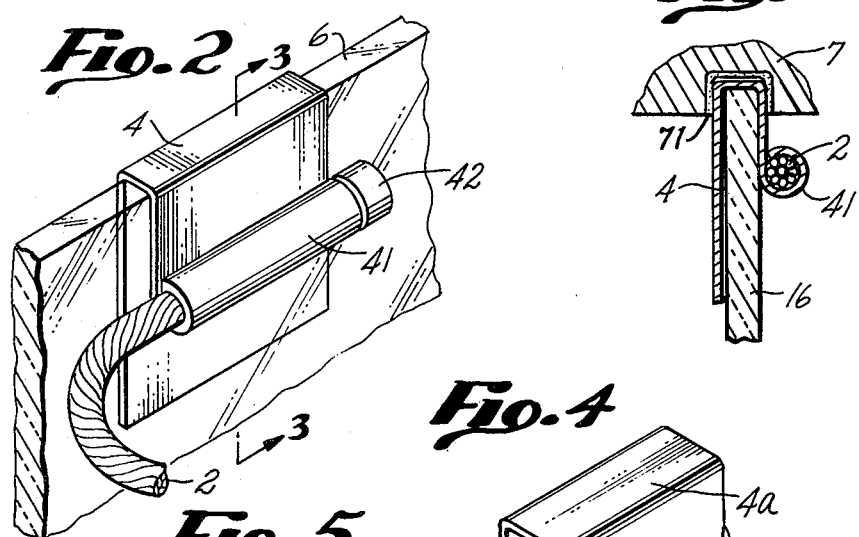
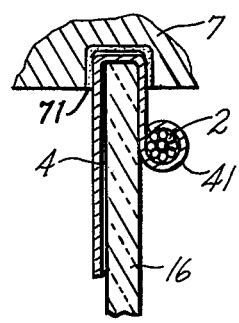
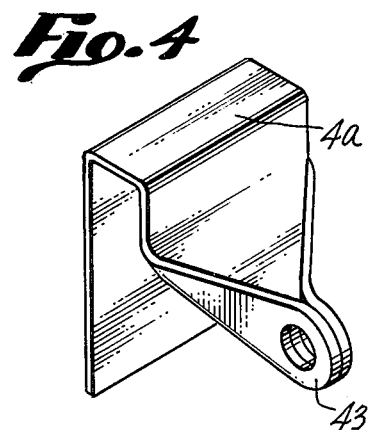
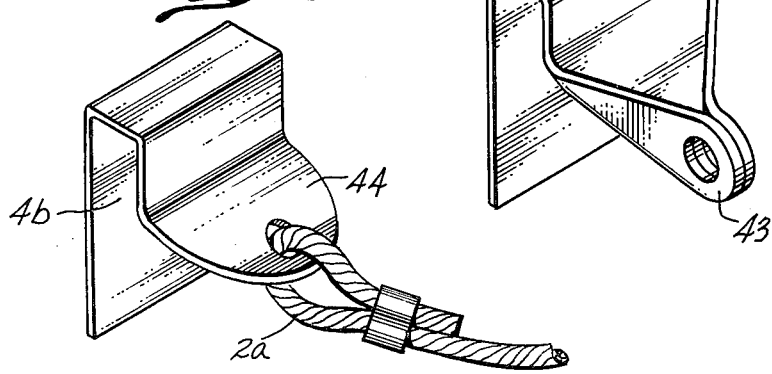

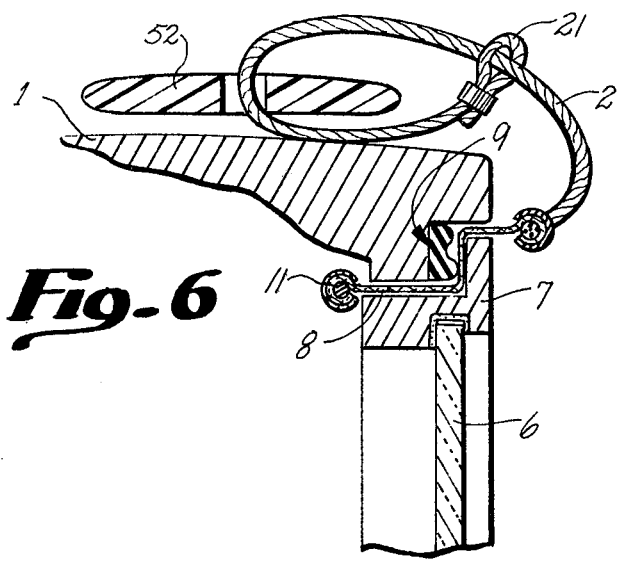
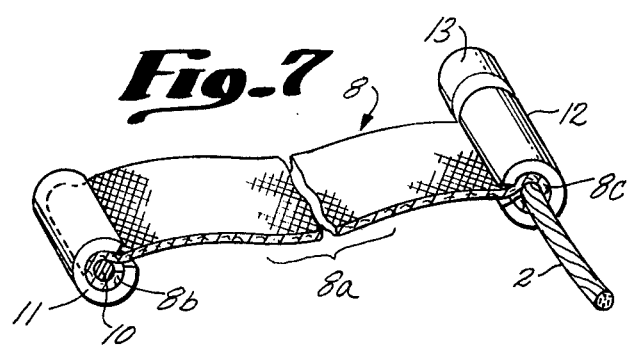
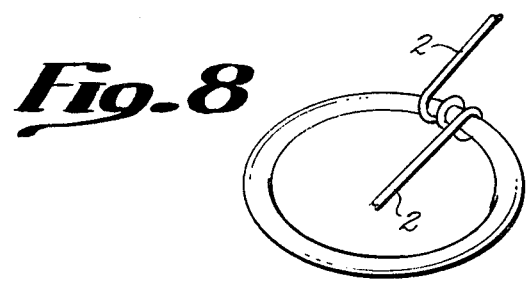

ANTI-THEFT CABLE DEVICE FOR CAR TOP CARRIERS

TECHNICAL FIELD

This invention relates to locking devices for preventing, or making more difficult, the theft of movable objects by tethering them with a steel cord or cable. In particular, it relates to tether-type anti-theft devices for surfboards, sailboards, skis, and the like, while being carried on the top of an automobile. In this class of devices, a flexible steel cable or the like connects the protected object or load to some portion of the car.

BACKGROUND ART

Sheet metal clip-like devices are known which fit over the top edge of the glass in a car window. U.S. Pat. No. 2,626,713 shows such a clip supporting a garment hanger. U.S. Pat. No. 3,744,281 shows a clip of this general type with a key-container attached. U.S. Pat. No. 2,474,513 shows such a clip supporting an outboard rack for fishing rods and the like.

Short lengths of plastic-covered steel cable are known for tethering objects against theft, e.g., bicycles to bicycle racks. The tethering cables are usually secured with conventional padlocks. U.S. Pat. Nos. 3,091,011 and 3,590,608 show such means for tethering skis to ski racks. U.S. Pat. No. 3,798,934 shows an anti-theft cable tether for a motorcycle helmet, employing a modified kind of padlock.

The above art is the closest found in a preliminary search. I am not aware of any prior art disclosing an anti-theft tether secured to a clip-like device held in a motor vehicle door or window by the state of closure itself, without any special lock, and anchoring the end of the tether which retains a load carried on the top or outside of the vehicle.

DESCRIPTION OF THE DRAWING

FIG. 1 is a perspective view of a portion of a sailboard carried on a car top and secured by a cable according to the invention;

FIG. 2 is a detail perspective view of a sheet metal window clip of the invention;

FIG. 3 is a section on line 3—3 of FIG. 2;

FIGS. 4 and 5 are perspective views of alternative forms of sheet meal window clips;

FIG. 6 is a partial sectional view of a flexible door clip with a cable securing a top load;

FIG. 7 is an enlarged perspective view of a flexible door clip; and

FIG. 8 shows a means for reducing slack in a cable.

DESCRIPTION OF THE PREFERRED EMBODIMENT

Referring first to FIG. 1, a portion of an automobile body is indicated at 1 with an object 5 carried on its top. A suitable car-top carrier or rack would be used, but is omitted for clarity of illustration. Object 5 here, for illustration, is a sailboard, which has an opening through it at 50. According to the invention, to secure object 5 against theft, a cable or tether 2 is passed through the opening 50 with an eye and bight, in known manner, and then connected to the vehicle with a window clip 4. Cable or tether 2 is preferably of hard steel wire, such as aircraft control cable, and coated with a flexible plastic.

Shown in more detail in FIGS. 2 and 3, clip 4 is made of sheet metal in the general shape of a short length of deep channel to fit over the edge of a car window 6. In FIGS. 2 and 3, the tether or steel cable 2 is attached permanently to clip 4 by passing through a rolled portion 41, and kept from pulling out by a crimped-on cable end or button 42 in known manner. Clip 4 is thin and stiff, made preferably of a suitable hardened alloy stainless steel, about 1 mm (0.040 inch) thick. Such material effectively resists ordinary manual efforts to bend it or to cut it with tin snips, yet is thin enough to fit between the glass of a car window and the glass run channel 71 when the window is closed. After the sheet metal clip 4 is slipped over the edge of the window, the user rolls the window up and locks the car doors. The clip cannot then be removed so long as the doors are closed.

FIG. 3 shows in section how the clip 4 fits into the channel in the window frame 7.

FIGS. 4 and 5 show alternative shapes for the sheet metal clips 4a and 4b. Holes 43, 44 provide for holding the end of the cable 2 by suitable means, such as a crimped cable end (FIGS. 2–3) or an eye 2a, FIG. 5. In FIG. 4, a pair of bent-out tabs are brought together to provide a double thickness for hole 43; in FIG. 6, there is a single tab 44.

FIGS. 6 and 7 show another form of clip 8 which is flexible and strap-like, and adapted to be inserted between a car door 7 and the door jamb 9. When a flexible clip 8 is so inserted and the door closed and locked, it anchors the end of a cable 6 to the car, i.e., it cannot be pulled out when the door is closed. The cable is passed around or through a car-top load in the same manner as in, e.g., FIG. 1. In FIG. 6, the cable 2 is passed through a hole in a sailboard or the like.

In FIG. 7, the body portion 8a of the flat strap-like flexible clip 8 may be of braided steel wire and coated with a suitable flexible plastic. The wire should be hard, to resist cutting. The inside end 8b of flexible clip 8 is preferably looped or wrapped around a short length of metal rod 10 or the like, and then surrounded and covered by a crimped-on piece of split tubing 11, to produce an enlarged end portion. In FIG. 6, this enlarged end portion at 11 prevents the clip from being pulled out after the door 6, 7 is closed. At the outer end of flexible clip 8, a portion 8c is wrapped or looped around the end of cable 2 and held there by another crimped-on piece of split metal tubing 12. The end of cable 2 is provided with a crimped-on cable end 13 to prevent its pulling out, in the same manner as shown at 42 in FIG. 2.

Other types of construction may obviously be used for the flat flexible clip 8, consistent with the requirements for flexibility, an enlargement on the inner end, and permanent attachment to the end of cable 2.

Flexible clip 8 will adapt its contour to various shapes of door edges and door jambs. Preferably made of woven or braided hard steel wire, its general dimensions may be of the order of those of a wrist watch band, and about 0.5 to 2 mm thick.

In FIGS. 1 and 6, the objects carried 5, 52 have openings through which the anti-theft tether or cable 2 can be looped or passed. For protecting objects without holes, such as skis, the cable can be passed over or wrapped around them, provided they are carried in a rack so shaped as to prevent their being slipped out.

A means of adjusting the length of a cable 2 to take out slack is shown in FIG. 8, where the cable is given a suitable number of turns through a closed ring 60, whose center opening is large enough to permit a fitting, such as a clip 4 or 8, to pass through.

The term "door" herein means any closure element that can be opened and closed and locked, such as a door, hatch, trunk lid, or the like.

I claim:

1. An anti-theft device for tethering a load carried on the outside of a vehicle, comprising:
    a stiff sheet metal clip shaped as a short section of deep channel fittable over the top edge of a window glass of said vehicle and thin enough to permit said window glass to be substantially closed with said clip in place thereon,
    said clip being removable only when said window is opened;
    and a cable-like tether permanently attached to said clip at a retaining portion thereof,
    said retaining portion being a pair of bent-out tabs brought together with a common hole through both.

2. An anti-theft device for tethering a load carried on the outside of a vehicle, comprising: a clip device fitting between an edge of a door of said vehicle and the mating door jamb and removable only when said door is open; and a cable-like tether permanently attached to said clip device to tether said load,
    said clip device being a thin, flat, flexible strap-like element adapted to be shut between said door and jamb and having an enlargement at its inner end to prevent its being pulled out when said door is closed; and
    wherein said clip device is of braided wire about 0.5 to 2 mm thick and about 1 to 3 cm wide.

3. A device as in claim 2 wherein said clip device is of woven wire about 0.5 to 2 mm thick and about 1 to 3 cm wide.

4. A device as in claim 2 wherein said clip device wrapped around a cylindrical element and then surrounded by a crimped-on piece of split tubing at its inner end to provide said enlargement, and wrapped at its outer end around the end portion of said tether, and then surrounded by another crimped-on piece of split tubing as partial securement of said tether.

5. An anti-theft device for tethering to a vehicle a load carried on the outside of said vehicle, comprising:
    a clip fitting between an edge portion of the glass of a window of said vehicle and the mating glass run channel and removable only when said window is open; and
    a tether permanently attached at its inner end portion to a retaining portion of said clip and adapted to tether said load to said vehicle to prevent its removal therefrom, said tether being a length of flexible cut-resistant cable-like material and having an eye at its outer end,
    said clip and eye being of dimensions to permit said clip to be passed around a portion of said load and then through said eye to form a bight around said portion to tether said load, and wherein
    said clip is of hardened sheet metal generally about 0.5 to 1 mm thick, and resisting cutting with ordinary hand tools but being thin enough to slip between said glass and channel when said window is fully closed.

6. A device as in claim 5, wherein:
    said tether is a length of stranded hard steel cable, and
    said retaining portion is a rolled portion enclosing said inner end of said tether,
    a button being swaged onto said end to prevent its withdrawal.

7. A device as in claim 5, wherein:
    said retaining portion is a bent-out tab having a hole through which said inner end extends.

* * * * *